(12) United States Patent
Fukumori

(10) Patent No.: US 10,190,659 B2
(45) Date of Patent: Jan. 29, 2019

(54) BICYCLE CHAIN

(71) Applicant: Shimano Inc., Sakai-shi, Osaka (JP)

(72) Inventor: Tsuyoshi Fukumori, Sakai (JP)

(73) Assignee: Shimano Inc., Sakai-shi, Osaka (JP)

( * ) Notice: Subject to any disclaimer, the term of this patent is extended or adjusted under 35 U.S.C. 154(b) by 0 days.

(21) Appl. No.: 14/250,175

(22) Filed: Apr. 10, 2014

(65) Prior Publication Data

US 2015/0292597 A1 Oct. 15, 2015

(51) Int. Cl.
*B62M 9/00* (2006.01)
*F16G 13/06* (2006.01)
*F16G 15/12* (2006.01)

(52) U.S. Cl.
CPC .............. *F16G 15/12* (2013.01); *B62M 9/00* (2013.01); *F16G 13/06* (2013.01); *B62M 2009/005* (2013.01)

(58) Field of Classification Search
CPC .......... F16G 13/00; F16G 13/06; F16G 13/07; F16G 13/18; F16G 15/12; B62M 2009/005; B62M 2009/007
See application file for complete search history.

(56) References Cited

U.S. PATENT DOCUMENTS

| | | | |
|---|---|---|---|
| 3,359,815 A * | 12/1967 | Mueller | B21L 15/005 474/231 |
| 4,265,134 A * | 5/1981 | Dupoyet | F16G 13/06 474/231 |
| 5,226,857 A * | 7/1993 | Ono | F16G 13/06 474/231 |
| 5,322,482 A * | 6/1994 | Wang | F16G 13/06 474/206 |

(Continued)

FOREIGN PATENT DOCUMENTS

| DE | 102004011572 A1 | 9/2005 |
|---|---|---|
| TW | I329716 B | 9/2010 |

OTHER PUBLICATIONS

"KMC X10.93 10-Speed 116-Links Bicycle Chain, Silver/Grey, ½×1⅛-Inch", KMC Chain, Accessed Apr. 10, 2014, http://www.amazon.com/KMC-10-Speed-116-Links-Bicycle-28-Inch/dp/B001AYOP9M, 5 pages.

*Primary Examiner* — Minh Truong
(74) *Attorney, Agent, or Firm* — Alleman Hall Creasman & Tuttle LLP

(57) ABSTRACT

An outer link plate for a bicycle chain is provided. The outer link plate has an interior surface configured to face another counterpart outer link plate in an assembled state and an exterior surface opposite to the interior surface. The outer link plate has an outer perimeter, and first and second end portions including respective first and second openings each having corresponding parallel center axes. An intermediate portion is provided interconnecting the first end portion and the second end portion. The intermediate portion has an axially recessed portion formed along the outer perimeter on the exterior surface, the intermediate portion having a pair of intermediate edges formed along the outer perimeter, the axially recessed portion being formed on at least one of the intermediate edges and including a chamfered portion connecting the at least one of the intermediate edges to the exterior surface of the outer link plate.

15 Claims, 6 Drawing Sheets

(56) References Cited

U.S. PATENT DOCUMENTS

| | | | |
|---|---|---|---|
| 5,322,483 A * | 6/1994 | Wang | F16G 13/06 474/206 |
| 5,346,006 A * | 9/1994 | Wu | F16G 13/06 474/206 |
| 5,437,577 A * | 8/1995 | Wu | B62M 9/00 474/218 |
| 7,437,870 B2 * | 10/2008 | Wu | F16G 13/06 474/206 |
| 7,946,941 B2 | 5/2011 | Oishi et al. | |
| 2005/0020394 A1 * | 1/2005 | Valle | B62M 9/00 474/155 |
| 2007/0180808 A1 | 8/2007 | Wu | |
| 2008/0015072 A1 * | 1/2008 | Nagao | F16G 13/06 474/206 |

* cited by examiner

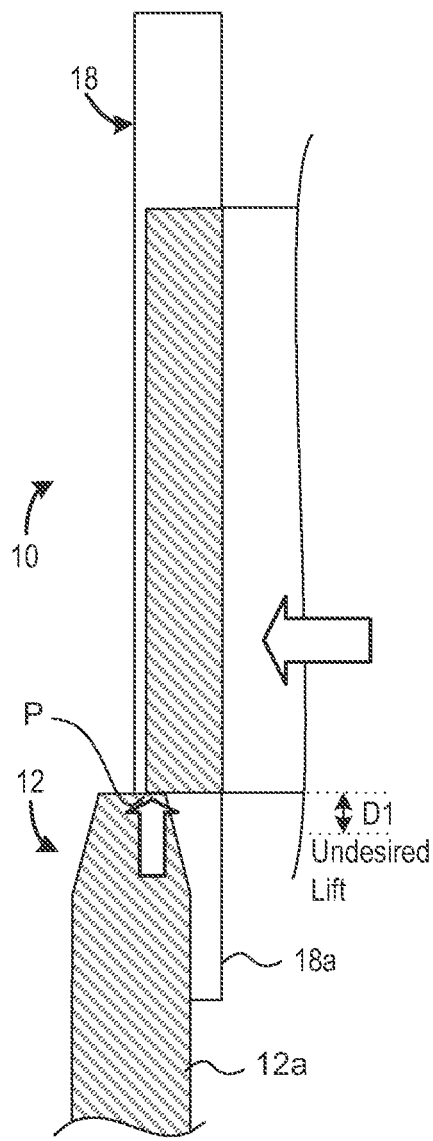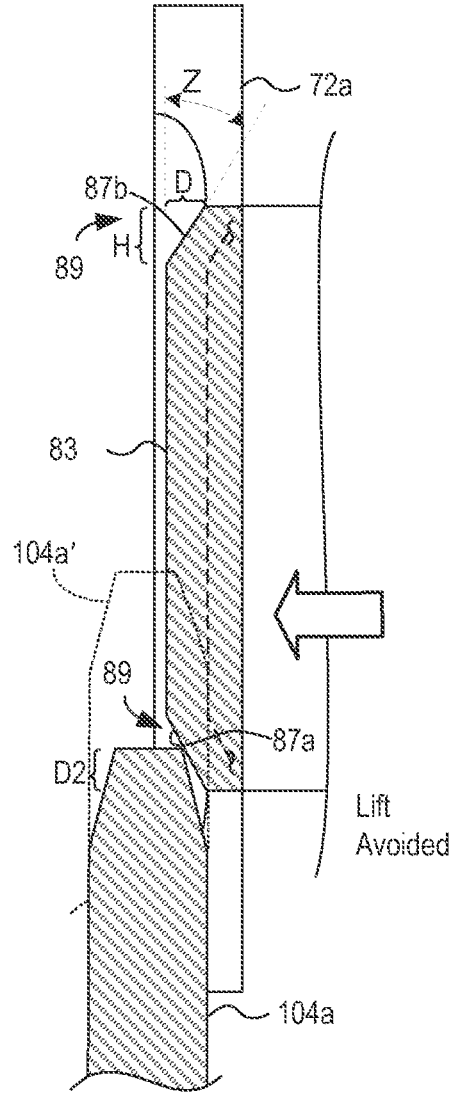
FIG. 6
(PRIOR ART)
FIG. 7

BICYCLE CHAIN

FIELD OF THE INVENTION

This disclosure generally relates to a bicycle chain having recessed portions to obtain more design freedom for a bicycle rear sprocket than a conventional bicycle chain.

BACKGROUND

Typical multi-speed bicycles have a crankset with two or three chainrings and a rear cassette with between five and eleven sprockets. Bicycle chains have a plurality of inner links and a plurality of outer links that are interconnected in an alternating manner by a plurality of pins. Typically, each of the inner links includes a pair of parallel inner link plates connected by a pair of parallel hollow cylinders or pins surrounded by cylindrical rollers. Each of the outer links includes a pair of parallel outer link plates connected to the adjacent inner links by the pins of the adjacent inner links.

Chainrings and sprockets may be referred to generally as gears, and their size may be specified in terms of the number of teeth on the gear: a relatively larger gear is larger in diameter and has more teeth; a relatively smaller gear is smaller in diameter and has fewer teeth. The rider selects a desired speed (i.e., gear ratio) by operating a front derailleur to move the bicycle chain laterally onto a desired chainring and a rear derailleur to move the chain laterally onto a desired rear sprocket. A relatively larger front chainring corresponds to a harder gear (upshifting). A relatively larger rear sprocket corresponds to an easier gear (downshifting).

Upshifting at the crankset and downshifting at the rear cassette (in both cases, moving onto a more-toothed, larger-diameter gear) conventionally require that the larger gear have specially-profiled shifting teeth, shifting ramps and/or pins to assist the chain in moving upward and laterally to engage with the larger gear. However, even when such features are appropriately deployed on a well-adjusted bicycle, selection of the larger gear can be noisy and subject to skipping, slipping, delayed chain engagement, chain suck, and other problems.

Prior art FIG. 1 is a side view that depicts an in-progress downshifting operation in which chain 10 is being disengaged with a smaller sprocket 11 and engaged with larger sprocket 12. During this operation, chain 10 is being moved laterally by a rear derailleur (not shown) in a direction into the page (i.e., away from the reader), with the smaller sprocket 11 being in front of the larger sprocket 12 (i.e., closer to the reader coming out of the page). Sprocket 12 is rotating clockwise, as indicated by the drive direction arrow DD in the figure.

FIG. 1 depicts three outer links: outer link 16; outer link 18; and outer link 20. Each outer link has two outer link plates, one of which is visible in the figure (the other is deeper into the page and thus obscured in this side view). Specifically, outer link plate 16a of outer link 16 is visible; outer link plate 18a of outer link 18 is visible; and outer link plate 20a of outer link 20 is visible.

Outer link 16 in the figure is fully engaged with sprocket 11. In other words, sprocket tooth 11a is fully received between the outer link plates 16a of outer link 16. In this depiction, links that engage later in time relative to other links may be referred to as "upstream links," since they are upstream relative to the drive direction DD. For example, outer links 18 and 20 are upstream relative to outer link 16; outer link 20 is upstream relative to outer link 18; etc.

One problem that can occur while the chain 10 is being shifted from the smaller sprocket 11 to the larger sprocket 12 is that the outer link plate 18a on the opposite side (facing into the page and not visible in FIG. 1) of outer link 18 may come into contact with tooth 12a of sprocket 12 at point P, causing the outer link 18 to be lifted undesirably and ride up upon the tooth 12a as the sprocket 12 rotates. This can cause an unnatural bend in the chain upward as compared to the natural position 13 (shown in dotted lines) that the chain would assume if it was not undesirably lifted by tooth 12a. FIG. 6 is a cross-sectional view taken along line 6-6 in FIG. 1, and illustrates the contact between the sprocket tooth 12a and the outer link plate 18a at point P. This contact lifts outer link 18 an undesired lift distance D1. As a consequence of the chain being undesirably lifted in this manner, upstream links from outer link 18 are prevented from smoothly engaging with the sprocket 12 while the tooth 12a lifts the outer link 18. Further, outer link 18 may suddenly fall from the top of the tooth 12a, and although this may result in engagement of the tooth 12a and outer link 18, it may cause a shock to be transmitted from the sprocket 12 to the rider, resulting in an unpleasant shifting feel.

SUMMARY

To address the above discussed issues, an outer link plate for a bicycle chain is provided. According to a first aspect of the invention, the outer link plate has an interior surface configured to face another counterpart outer link plate in an assembled state of the bicycle chain, and an exterior surface opposite to the interior surface. The outer link plate has an outer perimeter and includes (i) a first end portion including a first opening having a first center axis, (ii) a second end portion including a second opening having a second center axis parallel to the first center axis, and (iii) an intermediate portion interconnecting the first end portion and the second end portion, the intermediate portion having a axially recessed portion formed along the outer perimeter on the exterior surface, the intermediate portion having a pair of intermediate edges formed along the outer perimeter, the axially recessed portion being formed on at least one of the intermediate edges and including a chamfered portion connecting the at least one of the intermediate edges to the exterior surface of the outer link plate.

One potential advantage of such a configuration is that the axially recessed portion and the chamfered portion inhibit the chain from being undesirably lifted up onto the crest of a tooth when shifting from a smaller gear to a larger gear, as described above. Specifically, the axially recessed portion provides some room for the top of the tooth to travel upward without contacting the outer link plate, and if contact is made between the axially recessed portion and the tooth, the chain is urged outward as the tooth slides against the external surface of the tooth so that the chain does not ride up on the crest of the tooth. This helps avoid the jarring feeling that can occur when a chain link which has ridden up on the crest of a tooth, suddenly falls.

In the first aspect, in a state where the assembled bicycle chain is mounted to a bicycle, the axially recessed portion may be formed so as to face a side surface of a sprocket tooth of a larger sprocket when the chain is shifted from a smaller sprocket to the larger sprocket. One potential advantage of such a configuration is that positioning the axially recessed portion in this way may enable the axial recessed portion to face the tooth of the larger gear, which helps facilitate the anti-lift properties described above.

In the first aspect, the chamfered portion may be formed to have an angle relative to an exterior surface of the intermediate portion that is between 25 and 65 degrees. Such an angle has the advantage that it removes sufficient material to permit movement of the tooth into the area that has been cut by the chamfer, while also allowing relative sliding between the external surface of the chamfer and the side of the tooth.

In the first aspect, the external surface of the chamfer may be substantially planar, which has the advantage of sliding easily with the relatively flat surface of the tooth, and also is relatively low cost to manufacture.

In the first aspect, the axially recessed portion may extend longitudinally from the intermediate portion into each of the end portions. Since the chain is prone to contact with the tooth at a location P, which as discussed above is near the interface between the intermediate portion and a downstream end portion, extending the axially recessed portion into the end portions helps avoid contact between the tooth and chain in this region.

In the first aspect, the chamfered portion may have a cross sectional profile that is curved or curvilinear. A curved profile may have the advantage that the tooth may smoothly engage and disengage with the intermediate portion.

In the first aspect, in a state where the assembled bicycle chain is mounted to a bicycle, the axially recessed portion may be formed so as to face a side surface of a sprocket tooth of a larger sprocket when the chain is shifted from a smaller sprocket to the larger sprocket. This has the advantage that positioning the axially recessed portion in this way may enable the axially recessed portion to face the tooth of the larger gear, which helps facilitate the anti-lift properties described above.

In the first aspect, the exterior surface of the outer link plate may face in an inward direction with respect to a bicycle frame when the bicycle chain is coupled to the bicycle frame. This also has the advantage of positioning the axially recessed portion formed on the outer link plate to be facing the direction in which larger sprockets are encountered during use, to help facilitate the anti-lift properties described above.

According to a second aspect of the invention, an outer link plate for a bicycle chain is provided which has an interior surface configured to face another counterpart outer link plate in an assembled state of the bicycle chain and an exterior surface opposite to the interior surface. The outer link plate may comprise a first end portion including a first opening having a first center axis, a second end portion including a second opening having a second center axis parallel to the first center axis, and an intermediate portion interconnecting the first end portion and the second end portion. The intermediate portion may have a pair of intermediate edges, at least one of the edges being chamfered so as to form a chamfered portion on the exterior surface.

One potential advantage of such a configuration is that the chamfered portion inhibits the chain from being undesirably lifted up onto the crest of a tooth when shifting from a smaller gear to a larger gear, as described above. If contact is made between the chamfered portion and the tooth, the chain is urged outward as the tooth slides against the external surface of the tooth so that the chain does not ride up on the crest of the tooth. This helps avoid the jarring feeling that can occur when a chain link which has ridden up on the crest of a tooth, suddenly falls.

In the second aspect, in a state where the assembled bicycle chain is mounted to a bicycle, the chamfered portion may be formed so as to face a side surface of a sprocket tooth of a larger sprocket when the chain is shifted from a smaller sprocket to the larger sprocket. This has the advantage of positioning the chamfered portion to be facing the larger sprocket during use, to help facilitate the anti-lift properties described above.

In the second aspect, in a state where the assembled bicycle chain is mounted to a bicycle, the exterior surface of the outer link plate may face in an inward direction with respect to a bicycle frame when the bicycle chain is coupled to the bicycle frame. This also has the advantage of positioning the chamfered portion on the outer link plate to be facing the direction in which larger sprockets are encountered during use, to help facilitate the anti-lift properties described above.

In the second aspect, the chamfered portion may be formed to have an angle relative to an exterior surface of the intermediate portion that is between 25 and 65 degrees. Such an angle has the advantage that it removes sufficient material to permit movement of the tooth into the area that has been cut by the chamfered portion, while also allowing relative sliding between the external surface of the chamfered portion and the side of the tooth.

In the second aspect, an external surface of the chamfered portion may be substantially planar, which also has the advantage of sliding easily with the relatively flat surface of the tooth, and also is relatively low cost to manufacture.

According to a third aspect of the invention, a bicycle chain is provided, which includes a plurality of inner links and outer links alternately linked together, each outer link including a pair of an outer link plates including a first outer link plate and a second outer link plate, the second outer link plate having an outer perimeter, an interior surface configured to face the first outer link plate in an assembled state of the bicycle chain, and an exterior surface opposite to the interior surface. The second outer link plate may include a first end portion including a first opening having a first center axis, a second end portion including a second opening having a second center axis parallel to the first center axis, and an intermediate portion interconnecting the first end portion and the second end portion. The intermediate portion may include an axially recessed portion formed along the outer perimeter on the exterior surface, and may have a pair of intermediate edges formed along the intermediate portion. The axially recessed portion may be formed on at least one of the intermediate edges and may include a chamfered portion connecting the at least one of the intermediate edges to the exterior surface of the second outer link plate.

One potential advantage of such a configuration is that the axially recessed portion and the chamfered portion inhibit the chain from being undesirably lifted up onto the crest of a tooth when shifting from a smaller gear to a larger gear, as described above. Specifically, the axially recessed portion provides some room for the top of the tooth to travel upward without contacting the outer link plate, and if contact is made between the axially recessed portion and the tooth, the chain is urged outward as the tooth slides against the external surface of the tooth so that the chain does not ride up on the crest of the tooth. This helps avoid the jarring feeling that can occur when a chain link which has ridden up on the crest of a tooth, suddenly falls. In the third aspect, the axially recessed portion may be formed so as to face a side surface of a sprocket tooth of a larger sprocket when the chain is shifted from a smaller sprocket to the larger sprocket. One potential advantage of such a configuration is that positioning the axially recessed portion in this way may enable the axial recessed portion to face the tooth of the larger gear, which helps facilitate the anti-lift properties described above.

In the third aspect, the chamfered portion may be formed so as to face a side surface of a sprocket tooth of a larger sprocket when the chain is shifted from a smaller sprocket to the larger sprocket. One potential advantage of such a configuration is that positioning the axially recessed portion in this way may enable the axially recessed portion to face the tooth of the larger gear, which helps facilitate the anti-lift properties described above.

In the third aspect, the exterior surface of the second outer link plate may faces in an inward direction with respect to a bicycle frame when the bicycle chain is coupled to the bicycle frame. This also has the advantage of positioning the axially recessed portion formed on the outer link plate to be facing the direction in which larger sprockets are encountered during use, to help facilitate the anti-lift properties described above.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which:

FIG. 6 is a cross-sectional view taken along line 6-6 in FIG. 1, which illustrates contact between a tooth of the sprocket and an exterior surface of the outer link plate of the prior art bicycle chain of FIG. 1;

FIG. 7 is a cross-sectional view taken along line 7-7 in FIG. 5, which illustrates the engagement between the sprocket and the bicycle chain of the present embodiment; and FIGS. 8A-8D illustrate cross-sectional profiles of an axially recessed portion of the outer link plate of the bicycle chain of FIG. 3; wherein FIGS. 1-8D are drawn approximately to scale unless otherwise indicated; however, other relative dimensions may be used, if desired.

DETAILED DESCRIPTION

Figure 2:
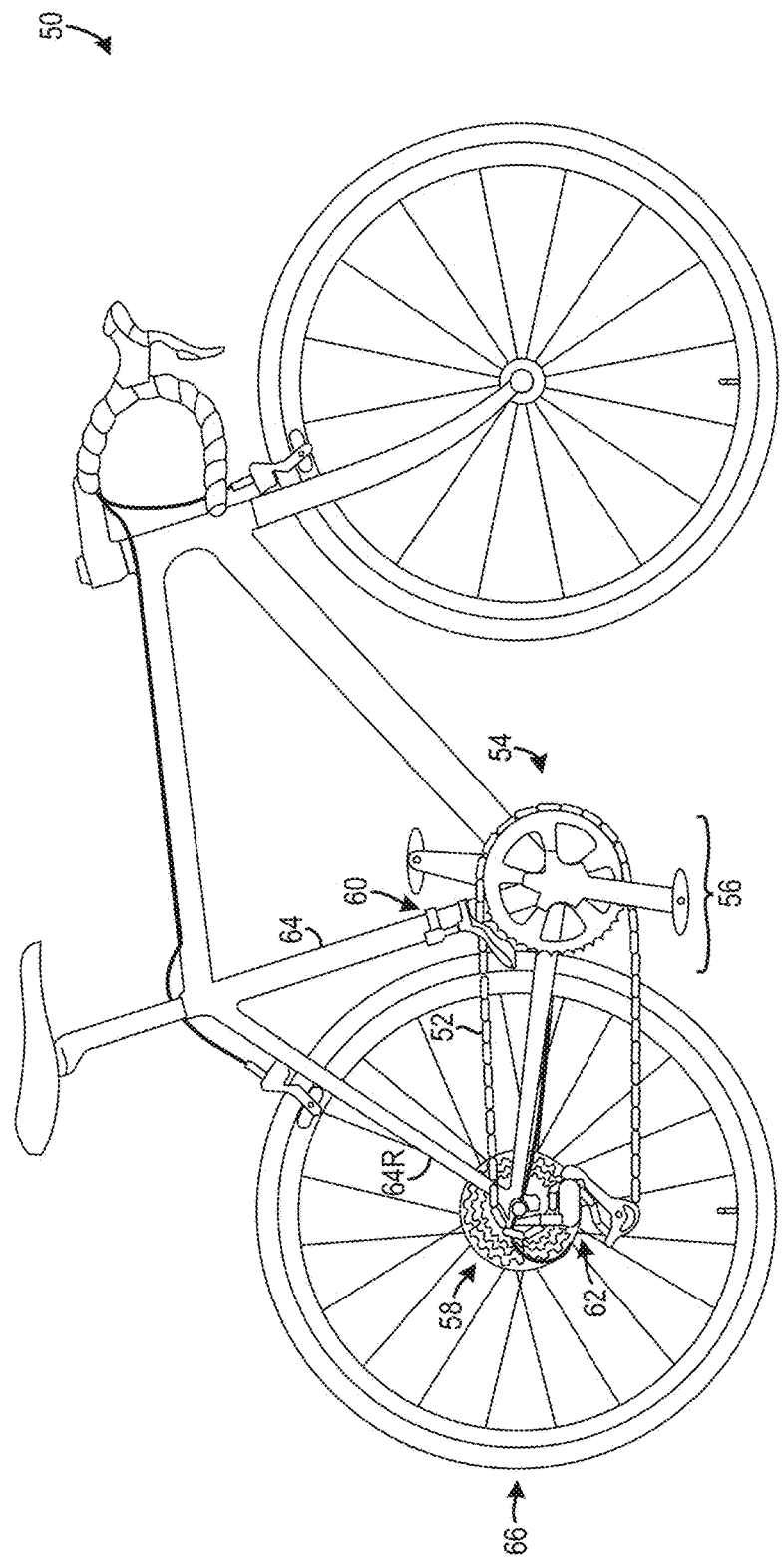
FIG. 2 shows a side view of an example bicycle.

Referring initially to FIG. 2, a bicycle 50 is illustrated that uses a bicycle chain 52 according to one example embodiment. The bicycle 50 includes, among other things, a drivetrain 54 configured to convert the rider's pedaling force into a driving force to propel the bicycle forward. The chain 52 is part of the drivetrain 54. The drivetrain 54 may also include a front crankset 56, a rear sprocket assembly 58, a front derailleur 60, and a rear derailleur 62. The rear sprocket assembly 58 includes a plurality of sprockets in the depicted example, so as to provide the bicycle with multiple gears/speeds.

In FIG. 2, the sprockets in the sprocket assembly 58 are coaxially stacked in order of size, with the smaller sprockets oriented laterally outward with respect to a central plane of the bicycle frame 64. Additionally, the front crankset 56 may include a plurality of chainrings in some examples. In other examples, however, the crankset may include only a single chainring. The front crankset 56 may be mounted on a bottom bracket that is secured in a bottom bracket shell on bicycle frame 64. The bottom bracket is configured to enable rotation of the crankset (i.e., as a result of pedaling), via one or more bearing assemblies, for instance.

The chain 52 is arranged on the front crankset 56 and the rear sprocket assembly 58 so as to extend therebetween, as shown in FIG. 2. Specifically, the chain 52 is engaged with teeth in both the front chainrings and rear sprockets, and partially encircles one chainring of the crankset and one sprocket of the sprocket assembly. The derailleurs 60 and 62 are configured to change gears by shifting the chain 52 laterally outward and inward relative to the central plane of the bicycle 50. It will be appreciated that the lateral direction may be parallel to a central rotating axis of the rear sprocket assembly 58. Therefore, a lateral axis extends into and out of the page in the view depicted in FIG. 2.

Figure 3:
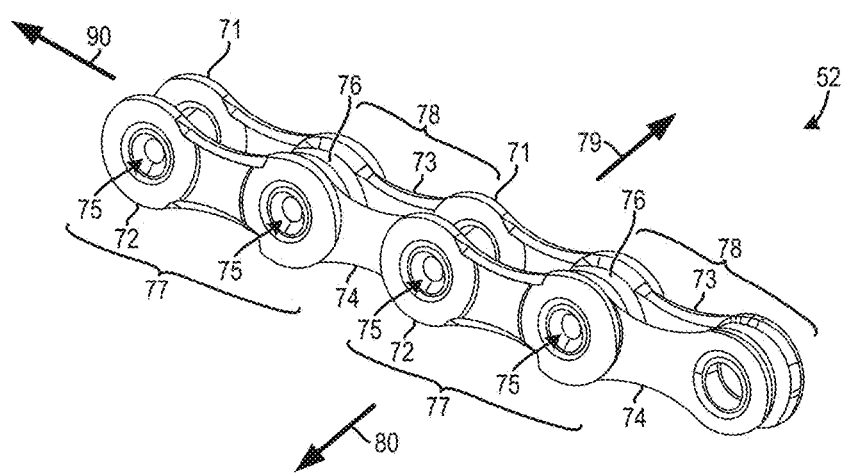
FIG. 3 shows a perspective view of a bicycle chain according to one embodiment of the present invention, the bicycle chain having sets of inner and outer link pairs, and being configured for use with the bicycle of FIG. 2.

Now turning to FIG. 3, the figure illustrates components of bicycle chain 52. Chain 52 includes a plurality of first outer link plates 71, which may be referred to as outside outer link plates, and a plurality of second outer link plates 72, which may be referred to as inside outer link plates. When the chain 52 is installed on bicycle 50, a laterally outward direction from the center plane of the bicycle frame 64 is indicated via arrow 79, and a laterally inward direction relative to the bicycle frame 64 is indicated via arrow 80. Additionally, a drive direction of the chain is indicated via arrow 90 in FIG. 3. The outer link plates of the chain are all substantially parallel to one another when lateral force is not applied to the chain via the drivetrain. Furthermore, the first outer link plates are spaced away from the second outer link plates.

The chain 52 also includes a plurality of first inner link plates 73, which may be referred to as outside inner link plates, a plurality of second inner link plates 74 which may be referred to as inside inner link plates, a plurality of link pins 75, also referred to as rivets, and a plurality of rollers 76. The first inner link plates 73 are spaced away from the second inner link plates 74 and are all substantially parallel to one another when lateral force is not applied to the chain via the drivetrain. Each opposed pair of the outer link plates 71 and 72 forms an outer link 77. Each opposed pair of the inner link plates 73 and 74 forms an inner link 78. The inner links 78 are interconnected in an alternating manner with the outer links 77 by the link pins 75. A master chain link (not shown) may interconnect two pairs of the inner links 78 together so as to form a single continuous chain loop. It will be appreciated that the continuous chain loop may extend around sprockets and chainrings in a drivetrain, such as the drivetrain 54 shown in FIG. 2. Furthermore, the rollers are positioned between opposing inner link plates as well as opposing outer link plates. The interfaces between the pins and the link plates provide rotational movement and bending of the chain about the central axes of the pins, enabling the chain to mate with sprockets and chainrings in the drivetrain.

The link plates (71, 72, 73, and/or 74), link pins 75, and rollers 76 may be metal parts. Suitable example materials include steel and titanium. The geometry, size, and/or characteristics of the link pins and/or the rollers may be varied as needed or desired. For example, the link pins 75 may be hollow pins or cylinders.

In the depicted example, each of the second outer link plates 72 has been modified relative to previous chain designs, in order to improve shifting from smaller gears to larger gears, "gear" being a general term encompassing both chainrings and sprockets. As previously discussed, moving to a larger gear at the crankset is upshifting, while moving to a larger sprocket in the rear is downshifting. Indeed, the first outer link plates 71 may have a similar geometry to the second outer link plates 72, so as to improve upshifting at the front crankset.

Figures 4A, 4C:
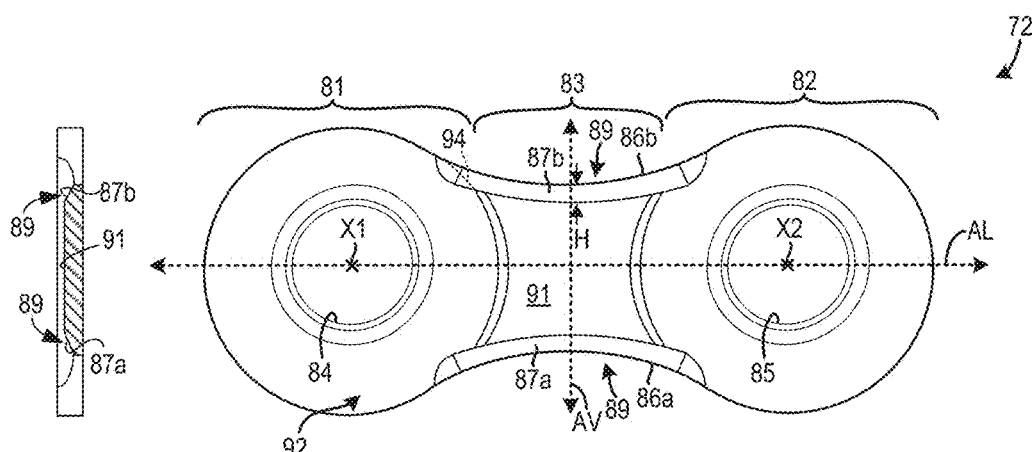
FIG. 4A is a side view showing an outer link plate of the bicycle chain of FIG. 3.
FIG. 4C is a cross sectional view taken along a vertical axis AV of the outer link plate of the bicycle chain of FIG. 3.
Figure 4B:
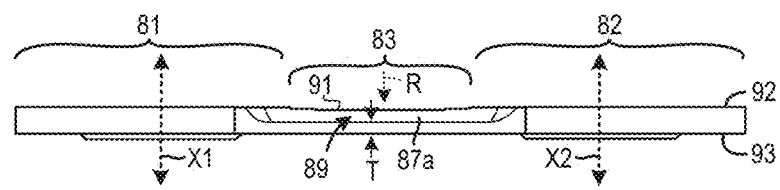
FIG. 4B is a bottom view of the outer link plate of the bicycle chain of FIG. 3.

Referring now to FIGS. 4A and 4B, one of the second outer link plates 72 is illustrated in detail. As shown, each of the second outer link plates 72 includes a first end portion 81, a second end portion 82 and an intermediate portion 83 interconnecting the first and second end portions 81 and 82. As indicated, parts of the perimeters of the end portions may have a circular contour. The portions (81, 82, and 83) of each of the second outer link plates 72 typically are formed as a one-piece unitary member from a single continuous piece of material (e.g., steel, titanium, etc.). As viewed from the side in FIG. 4B and in cross section in FIG. 4C, it will be appreciated that the intermediate portion 83 is stepped down such that its external surface 91 is axially recessed from the external surface of the first and second end portions 81, 82 so that an axially recessed portion is formed thereon. As used herein, the term "axially recessed" refers to a recess in a direction parallel to axes X1 and X2, introduced below, of outer link 77 and inward toward a central region of the outer link 77.

In the depicted example, first end portion 81 has a pin coupling opening 84 for receiving one of the link pins 75 (FIG. 3). Similarly, second end portion 82 has a pin coupling opening 85 for receiving one of the link pins 75. In one example, the ends of the link pins may be deformed for fixedly securing the first and second outer link plates 71 and 72 thereto. Specifically, the ends of the link pins may have a raised lip. As shown, the pin coupling openings 84 and 85 are circular. Therefore, the pin coupling openings may be referred to as circular pin coupling openings.

The pin coupling openings 84 and 85 have center points that define first and second center axes X1 and X2, which are parallel to each other, as seen in FIGS. 4A and 4B. It will be appreciated that the outer link pivots relative to its adjacent links about these axes. FIG. 4A also shows a longitudinal axis AL of the second outer link plate 72 passing perpendicularly through the first and second center axes X1 and X2 of the pin coupling openings 84 and 85. The longitudinal axis AL of the second outer link plate 72 bisects the intermediate portion 83 and the end portions 81 and 82, and the outer link plate 72 shown in FIG. 4A is symmetric about this axis AL.

As shown in FIG. 4B, the second outer link plate 72 has an exterior surface 92 that faces away from a corresponding first outer link plate 71 (FIG. 3), and an interior surface 93 that faces toward the first outer link plate 71. Note that the terms "exterior" and "interior" as used herein particularly refer to directions with respect to the chain, and not the bicycle. As will be explained in detail below, the exterior surface 92 has been significantly modified from prior art designs, so as to improve performance when the chain is being shifted laterally onto a larger sprocket.

Figure 1:
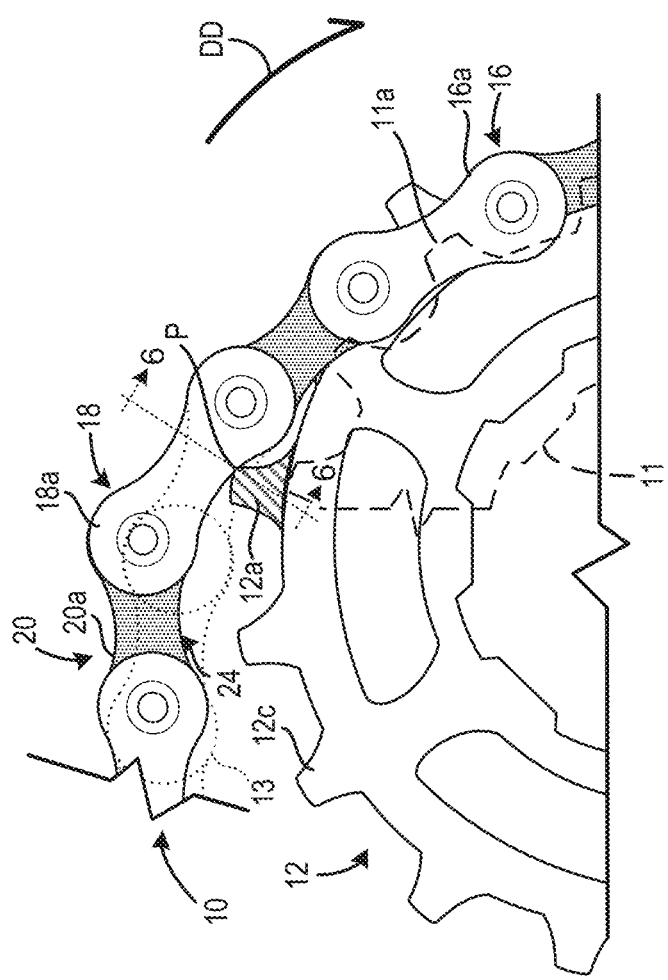
FIG. 1 shows a side view of a prior art chain engaging a sprocket.

To address the issues identified in the Background above and illustrated in FIGS. 1 and 6, the second outer link plate 72 on its exterior side within intermediate portion 83 is axially recessed in a recess direction R that is parallel to the axes X1 and X2. In this manner, an axially recessed portion 89 is formed. The axially recessed portion 89 may be formed to include the recessed exterior surface 91 and also chamfered portions 87a and 87b along the outer perimeter of the outer link plate 72. As discussed above and shown in FIGS. 4B and 4C, the external surface 91 of the intermediate portion 83 is recessed relative to the external surface of the first and second end portions 81, 82, and in turn the chamfered portions 87a and 87b of the intermediate portion 83 are further recessed relative to the external surface 91 (see FIG. 4C) of the intermediate portion 83. Typically, external surface 91 is substantially planar.

As shown in FIG. 4B, due to the axially recessed character of the axially recessed portion 89 including the external surface 91 of the intermediate portion 83, some or all of intermediate portion 83 may have a reduced thickness T relative to end portions 81 and 82. The thickness T of the intermediate portion may be about 20-60% of the overall thickness of the outer link plate, and in one particular arrangement, may be about 40% of the overall thickness of the outer link plate.

As seen in the depicted example, the intermediate portion 83 may have intermediate edges 86a and 86b extending generally longitudinally parallel to axis AL. As viewed from the side, these edges may have arched contours so that the edges smoothly transition into the circular contours on the perimeters of the first and second end portions 81 and 82.

As illustrated best in FIG. 4C, axially recessed portions 89 may be formed along the intermediate edges 86a and 86b and may be chamfered so as to include first and second chamfered portions 87a and 87b. As shown, the chamfered portions 87a and 87b are formed on the exterior side of the intermediate portion 83.

The chamfering may be implemented in a variety of configurations. As viewed from the side in FIG. 4A, the chamfered portions 87a and 87b may extend partly into the first and second end portions 81 and 82. Alternatively, the chamfered portions 87a and 87b may extend toward and stop at the boundaries between the intermediate portion 83 and the first and second end portions 81 and 82, one example of which is indicated at dashed line 94. As a further alternative, the chamfering may partly or wholly encircle the perimeters of the first and second end portions 81 and 82, in addition to being formed on the intermediate edges 86a and 86b of the intermediate portion 83.

As shown in FIG. 4A, the chamfered portions may extend through a vertical axis AV dividing the second outer link plate 72 in half, with the chamfered portions being symmetrical on both sides of this vertical axis AV. Alternatively, the chamfered portions may be positioned to the forward or aft of the vertical axis AV, or may otherwise be asymmetrical about axis AV. As shown in FIG. 7, the chamfered portion typically has a uniform height H and depth D along its length, but it will be appreciated that the height and depth may vary. The height and depth have a ratio substantially equal to 4:3 in the depicted embodiment, and thus the chamfer angle Z relative to the exterior surface is about 36 degrees. Alternatively, the chamfer may be formed at another chamfer angle Z in a range between 25-65 degrees relative to the exterior surface of the outer link plate.

Figure 8A:
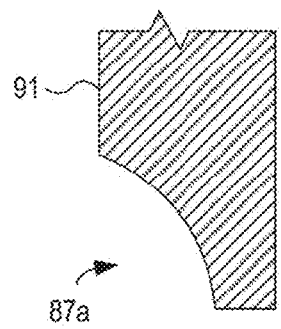
Figure 8B:
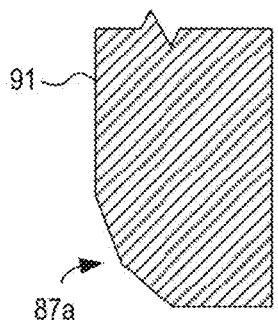
Figure 8C:
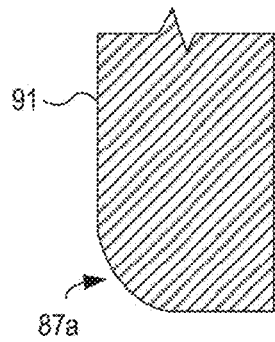
Figure 8D:
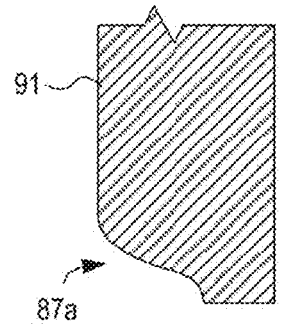

The chamfered portions may have a substantially planar outer surface, as illustrated in FIG. 4C. Alternatively, the chamfered portions may be formed to have a cross sectional profile that is curved or curvilinear, as shown in FIGS. 8A-8D. For example, the chamfered portion may include a curved profile as shown in FIG. 8A, a compound chamfer as shown in FIG. 8B, a radius profile as shown in FIG. 8C, or a ogee profile as shown in FIG. 8D. These alternative profiles may be applied at similar locations and with similar configurations on the outer link plate as the substantially planar chamfered portion discussed above. The commonality between these alternative profiles is that they afford a vertical relief which the sprocket may come into during shifting, as discussed below, and should a tooth come into contact with the chamfered portion from below, the chamfered portion will urge the tooth to the exterior surface 91.

When the second outer link plate 72 shown in FIGS. 4A-4C is assembled in a chain 52, as shown in FIG. 3, the second outer link plate 72 is oriented to have the axially recessed portions 89 including the recessed exterior surface 91 and the chamfered portions 87a and 87b on its external side, and this external side is oriented inwardly with regard to bicycle frame 64, i.e., to be a bicycle-facing side. More particularly, this external side is oriented inwardly with regard to a rear triangle 64R of the bicycle frame 64, shown in FIG. 2. In this configuration, during shifting from a smaller sprocket to a larger sprocket (downshifting), the axially recessed portion will afford space for a tooth of the larger sprocket to come up into as the chain is moved toward the larger sprocket, which will inhibit the chain riding up on a crest of the tooth, thereby promoting a sure and smooth shifting operation.

As an alternative, the second chamfered portion 87b described above may not be formed on the second outer link plate 72. However, one advantage of forming the chamfered portions 87a and 87b symmetrically on both edges is that the orientation of the second outer link plate 72 in the longitudinal axis AL can be ignored when assembling the chain 52, thereby saving assembly labor, time, and cost. In some examples, the exterior surfaces of the outer link plates 71 may be provided with similar lateral recess and/or chamfer features. This can improve chain engagement at the front crankset 56 during upshifting (i.e., movement of the chain from a smaller chainring to a larger chainring).

Figures 5A, 5B:
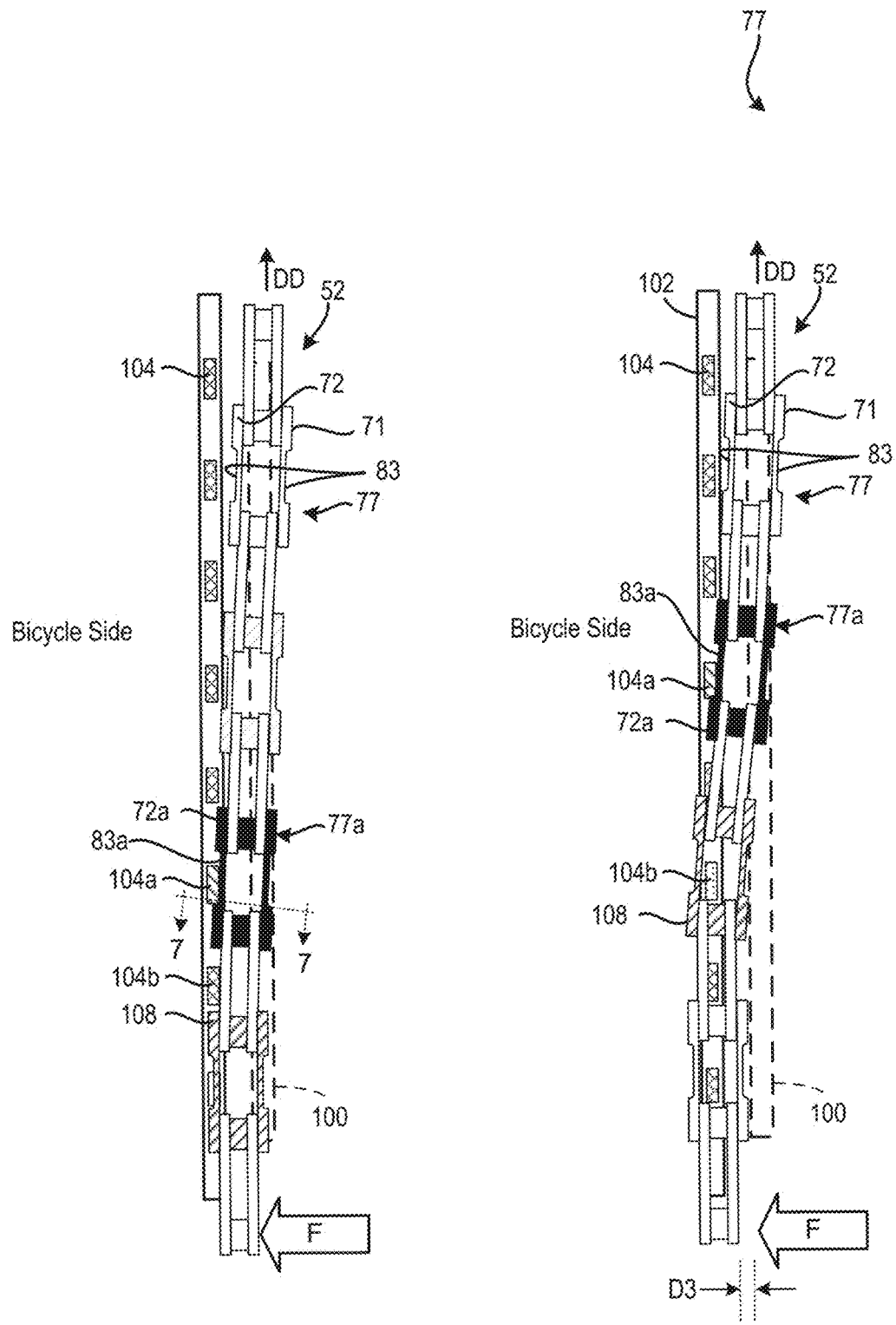
FIGS. 5A and 5B are a top views showing the bicycle chain of FIG. 3 in downshifting engagement with a sprocket, with FIG. 5A depicting the chain and sprocket at a stage earlier in time than FIG. 5B.

FIGS. 5A and B show top views of a sprocket downshifting operation, in which chain 52 is being moved laterally (i.e., leftward) from a smaller sprocket 100 to a larger sprocket 102, with FIG. 5A being earlier in time than FIG. 5B. It will be appreciated that the lateral distance between the sprockets is exaggerated for the sake of illustration in FIGS. 5A and 5B. A rear derailleur (not shown) is pushing the chain laterally onto sprocket 102 via application of lateral force F. Larger sprocket 102 has a plurality of teeth 104. As described above, chain 52 has outer links 77 and inner links 78. Each of the outer links 77 includes an outer link plate 72 that faces larger sprocket 102 when installed on the bicycle 50, and an opposing outer link plate 71. The outer link plates 72 include intermediate portions 83, which include an axially recessed portion formed on an axially recessed external surface, as discussed above. The axially recessed portion accommodates a tooth of sprocket 102 as the chain 52 transits from the smaller sprocket to the larger sprocket 102 to avoid the chain riding up on the crest of the tooth, as described below.

Referring now specifically to FIG. 5A, the right-facing side of tooth 104a is interacting with bicycle-facing exterior surface 91 of the intermediate portion 83a of outer link plate 72a. As the chain moves to the left, i.e., toward the larger gear 102, the axially recessed portion formed within the recessed exterior surface of the intermediate portion 83a approaches tooth 104a.

As illustrated in FIG. 7, taken along the dotted lines 7-7 in FIG. 5A, a top surface of the tooth 104a is accommodated within the axially recessed portion 89, enabling the tooth 104a to penetrate a distance D2 within the gap provided by the chamfered portion 87a of the axially recessed portion 89. This helps avoid contact between the tooth 104a and the outer link plate 72a, inhibiting the chain from riding up on the crest of the tooth 104a. Further, should contact occur between tooth 104a and the chamfered portion 87a, the tooth 104a will slide against the chamfered portion 87a and will move upward with respect to the outer link 77a, to the position shown in dashed lines at 104a'. It will be appreciated that FIG. 7 shows the relative positions of the outer link plate 72a and tooth 104a, but when sprocket 102 is installed on a bicycle 50 the tooth 104a is fixed, i.e., does not move, laterally, while the chain 52 is free to move laterally during the depicted shifting operation. Thus, when the tooth moves to the relative position shown in dashed lines at 104a', it will be appreciated that in actuality the chain is urged outwardly toward the smaller sprocket 100, so that the tooth 104a rests against the recessed exterior surface in the intermediate portion 83a of the outer link plate 72a of outer link 77a. In this manner, the outer link 77a of the chain 52 is inhibited from riding up on the crest of the tooth 104a.

FIG. 5B shows a point in time during the shifting operation slightly after the point in time shown in FIG. 5A, and accordingly outer link 77a is positioned further downstream in the drive direction DD of chain 52 in FIG. 5B than in FIG. 5A, and tooth 104a is shown rotated downstream in the rotational direction of the sprocket 102 as well. In FIG. 5A, smaller sprocket 100 is being driven by chain 52, while larger sprocket 102 co-rotating with smaller sprocket 100, but is not yet engaged and drive by chain 52. As illustrated in FIG. 5B, later in the shifting operation, after the tooth 104a has been accommodated within the axially recessed portion of outer link 77a, and the tooth 104a and outer link 77a have both traveled downstream, the chain 52 is enabled to move further laterally under the force of the derailleur (not shown) a distance D3, and as a result, upstream outer link 108 of the chain 52 is able to smoothly engage with upstream tooth 104b of sprocket 102. In this manner, the jarring shock associated with outer chain links riding up on the crest of teeth during shifting operations from a smaller to a larger gear can be avoided, and smooth shifting can be achieved, thereby overcoming the drawbacks of conventional chains discussed in the Background, and reducing problems such as skipping, slipping, delayed chain engagement, noise, etc.

While the outer link plates have an axially recessed portion 89 including a recessed exterior surface 91 and chamfered portions 87a and 87b in the above-mentioned embodiments, it will be appreciated that the recessed exterior surface 91 can be omitted while still facilitating the anti-lift properties described above.

The term "comprising" and its derivatives, as used herein, are intended to be open ended terms that specify the presence of the stated features, elements, components, groups, integers, and/or steps. This concept also applies to words of similar meaning, for example, the terms "have", "include" and their derivatives.

The terms of degree such as "substantially", "about" and "approximately" as used herein mean a reasonable amount of deviation of the modified term such that the end result is not significantly changed (e.g., manufacturing tolerances).

While specific embodiments of the bicycle and bicycle chain have been described in detail, the particular arrangements disclosed are meant to be illustrative only and not limiting. The features of the various embodiments described above, as well as modifications thereof, may be variously combined without departing from the scope of this disclosure.

The invention claimed is:

1. An outer link plate for a bicycle chain that is configured to engage or disengage with a larger sprocket and a smaller sprocket of a bicycle, the bicycle having a frame, the outer link plate comprising:
   an interior surface configured to face another counterpart outer link plate in an assembled state of the bicycle chain;
   an exterior surface formed opposite to the interior surface;
   an outer perimeter connecting the interior and exterior surfaces;
   a first end portion including a first opening having a first center axis;
   a second end portion including a second opening having a second center axis parallel to the first center axis; and
   an intermediate portion interconnecting the first end portion and the second end portion, the intermediate portion comprising a pair of intermediate edges formed along the outer perimeter, an axially recessed portion, and a chamfered portion provided between at least one of the intermediate edges and the axially recessed portion, wherein
   the exterior surface of the outer link plate comprises end portion exterior surfaces provided on the first end portion and second end portion, a recessed exterior surface provided on the axially recessed portion to be further recessed relative to the end portion exterior surfaces, and a chamfered portion exterior surface provided on the chamfered portion, and
   the chamfered portion exterior surface is further recessed relative to the recessed exterior surface of the axially recessed portion.

2. The outer link plate according to claim 1, wherein in a state where the assembled bicycle chain is mounted to the bicycle, the axially recessed portion is formed so as to face a side surface of a sprocket tooth of the larger sprocket when the chain is shifted from the smaller sprocket to the larger sprocket.

3. The outer link plate according to claim 1, wherein the chamfered portion is formed to have an angle relative to an exterior surface of the intermediate portion that is between 25 and 65 degrees.

4. The outer link plate according to claim 1, wherein the chamfered portion exterior surface is substantially planar.

5. The outer link plate according to claim 1, wherein the axially recessed portion extends longitudinally from the intermediate portion into each of the end portions.

6. The outer link plate according to claim 1, wherein the chamfered portion has a cross sectional profile that is curved or curvilinear.

7. The outer link plate according to claim 1, wherein the exterior surface of the outer link plate faces in an inward direction with respect to the bicycle frame when the bicycle chain is coupled to the bicycle frame.

8. An outer link plate for a bicycle chain that is configured to engage or disengage with a larger sprocket and a smaller sprocket on a bicycle, the bicycle having a frame, the outer link plate comprising:
   an interior surface configured to face another counterpart outer link plate in an assembled state of the bicycle chain and an exterior surface opposite to the interior surface;
   a first end portion including a first opening having a first center axis;
   a second end portion including a second opening having a second center axis parallel to the first center axis; and
   an intermediate portion interconnecting the first end portion and the second end portion, the intermediate portion comprising a pair of intermediate edges, a central portion interconnecting the pair of intermediate edges, and a chamfered portion ending at the first and second end portions and formed by at least a part of the pair of intermediate edges being chamfered, wherein
   the exterior surface of the outer link plate comprises end portion exterior surfaces provided on the first end portion and second end portion, intermediate edge exterior surfaces provided on the intermediate edges, and a chamfered portion exterior surface provided on the chamfered portion,
   the chamfered portion exterior surface is further recessed relative to the intermediate edge exterior surfaces of a non-chamfered part of the intermediate portion,
   the chamfered portion continuously extends between the first end portion and the second end portion such that the chamfered portion has a uniform height and a uniform depth along a length direction of the chamfered portion, the length direction being perpendicular to the first and second center axes, the uniform height being defined along a plane of the outer link plate, the uniform depth being defined in a direction parallel to the first and second center axes, and
   in a state where the assembled bicycle chain is mounted to the bicycle, the chamfered portion is formed so as to face a side surface of a sprocket tooth of the larger sprocket when the chain is shifted from the smaller sprocket to the larger sprocket.

9. The outer link plate according to claim 8, wherein in a state where the assembled bicycle chain is mounted to the bicycle, the exterior surface of the outer link plate faces in an inward direction with respect to the bicycle frame when the bicycle chain is coupled to the bicycle frame.

10. The outer link plate according to claim 8, wherein the chamfered portion is formed to have an angle relative to an exterior surface of the intermediate portion that is between 25 and 65 degrees.

11. The outer link plate according to claim 8, wherein the chamfered portion exterior surface is substantially planar.

12. A bicycle chain that is configured to engage or disengage with a larger sprocket and a smaller sprocket on a bicycle, the bicycle having a bicycle frame, the bicycle chain comprising:

a plurality of inner links and outer links alternately linked together;

each outer link including a pair of outer link plates including a first outer link plate and a second outer link plate, the second outer link plate having an outer perimeter, an interior surface configured to face the first outer link plate in an assembled state of the bicycle chain, and an exterior surface opposite to the interior surface, the second outer link plate comprising:

a first end portion including a first opening having a first center axis;

a second end portion including a second opening having a second center axis parallel to the first center axis; and an intermediate portion interconnecting the first end portion and the second end portion, the intermediate portion comprising a pair of intermediate edges formed along the intermediate portion, an axially recessed portion, and a chamfered portion provided between at least one of the intermediate edges and the axially recessed portion, wherein the exterior surface of each outer link plate comprises end portion exterior surfaces provided on the first end portion and second end portion, a recessed exterior surface provided on the axially recessed portion to be further recessed relative to the end portion exterior surfaces, and a chamfered portion exterior surface provided on the chamfered portion, and the chamfered portion exterior surface is further recessed relative to the recessed exterior surface of the axially recessed portion.

13. The bicycle chain according to claim 12, wherein the axially recessed portion is formed so as to face a side surface of a sprocket tooth of the larger sprocket when the chain is shifted from the smaller sprocket to the larger sprocket.

14. The bicycle according to claim 12, wherein the chamfered portion is formed so as to face a side surface of a sprocket tooth of the larger sprocket when the chain is shifted from the smaller sprocket to the larger sprocket.

15. The bicycle chain according to claim 12, wherein the exterior surface of the second outer link plate faces in an inward direction with respect to the bicycle frame when the bicycle chain is coupled to the bicycle frame.

* * * * *